United States Patent [19]

Parker

[11] Patent Number: 4,616,624
[45] Date of Patent: Oct. 14, 1986

[54] PORTABLE GRILL

[76] Inventor: Robert F. Parker, P.O. Box 2551, Victoria, Tex. 77902

[21] Appl. No.: 825,598

[22] Filed: Feb. 3, 1986

[51] Int. Cl.[4] ............................................. F24C 1/16
[52] U.S. Cl. ................................. 126/9 R; 126/25 R
[58] Field of Search .................. 126/25 R, 9 R, 9 A, 126/9 B, 25 A, 30, 29, 38, 304 R, 305, 306

[56] References Cited

U.S. PATENT DOCUMENTS

| | | | |
|---|---|---|---|
| 1,725,521 | 8/1929 | Keiner | 126/25 R |
| 3,049,071 | 8/1962 | Diack | 126/9 R |
| 3,094,113 | 6/1963 | Avila | 126/30 |
| 3,176,676 | 4/1965 | Caldwell | 126/9 R |
| 3,327,698 | 6/1967 | Leslie | 126/9 R |
| 3,765,397 | 10/1973 | Henderson | 126/9 R |

Primary Examiner—James C. Yeung
Attorney, Agent, or Firm—B. P. Fishburne, Jr.

[57] ABSTRACT

A portable barbecue grill knocks down readily into a compact state for travel or for storage in a limited space. In the assembled state, the unit is larger than known portable grills which cannot be disassembled at all or are difficult to disassemble, and the unit is capable of grilling several large steaks or cooking larger cuts of meat. When disassembled, the fire pan nests within the cover and has its open top covered by a base plate of the unit during transport or storage. The grill rack and a pedestal tube are then also stored within the fire pan.

3 Claims, 4 Drawing Figures

U.S. Patent Oct. 14, 1986 4,616,624
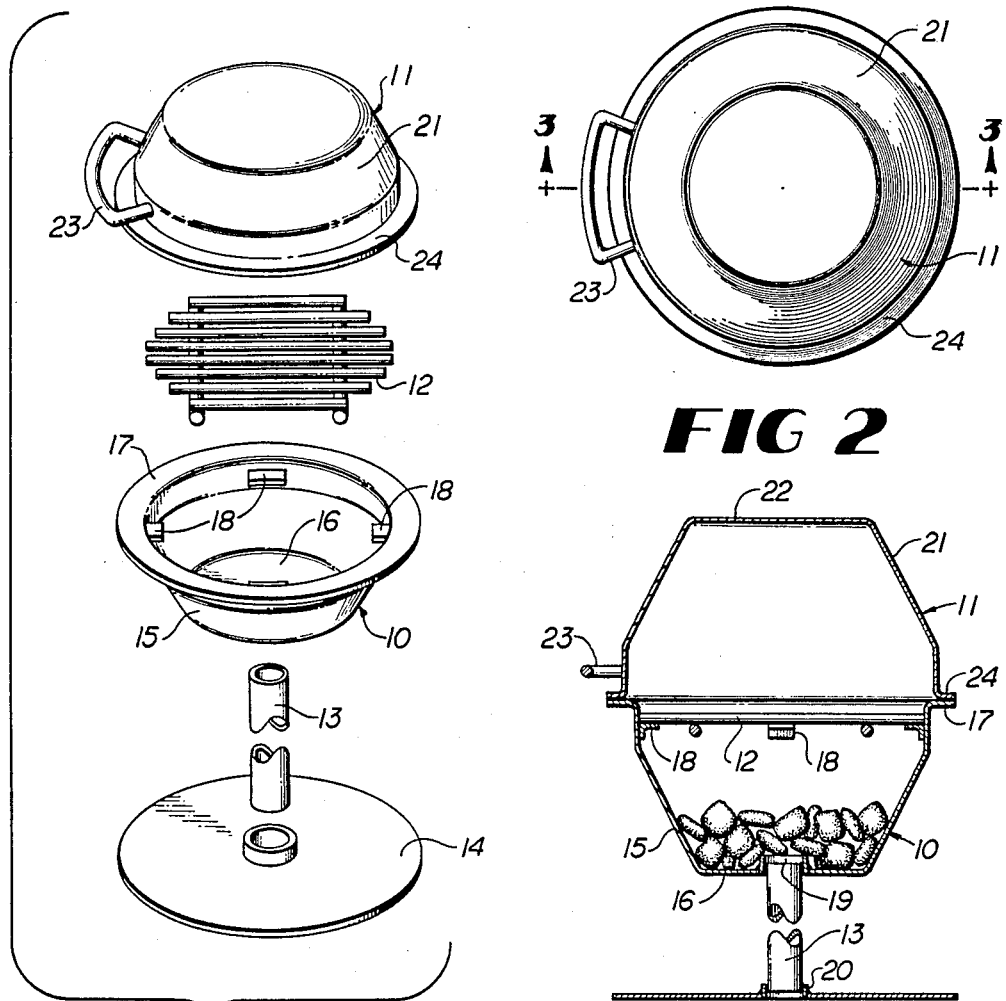
FIG 1
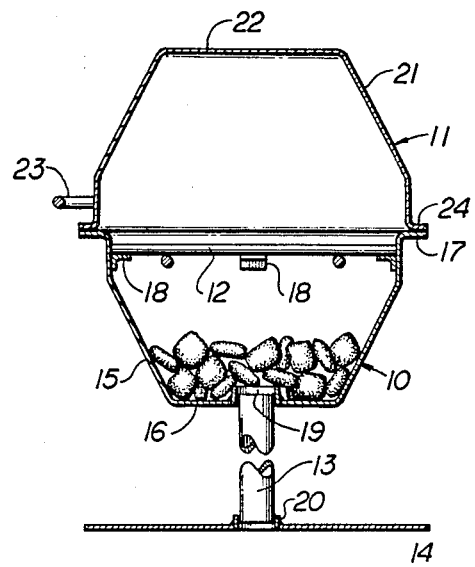
FIG 2
FIG 3
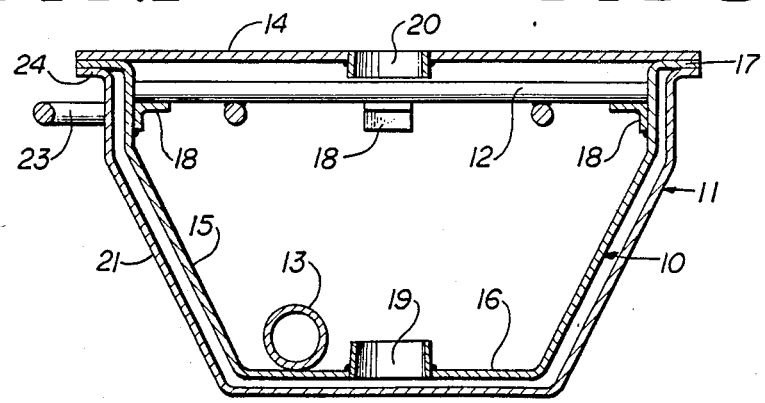
FIG 4

4,616,624

PORTABLE GRILL

BACKGROUND OF THE INVENTION

Portable outdoor cookers or grills usually fired by charcoal briquettes are well known and are in wide usage in a variety of configurations. Known devices of this character which are capable of being disassembled or folded for transport or storage tend to be very limited in cooking capacity, and many prior art grills are not adapted to be easily disassembled without the use of tools, and some cannot be disassembled.

With the above in mind, the present invention has for a primary object the provision of a charcoal grill or pit which in the assembled state provides a quite large cooking space capable of grilling several large steaks simultaneously or cooking a large roast or other cut of meat. At the same time, the grill according to the invention is very easily disassembled, without the need for any tools, and when disassembled the various parts of the device interfit in a way enabling the device to be stored in a minimal space and to be easily transported, such as in the trunk of an automobile. In the knock-down condition, the fire pan of the unit nests within the cover and may contain a pedestal tube therein along with the grill rack engaging the regular grill rack rests. The base plate of the unit then rests on a top flange of the fire pan and forms a cover for the fire pan, whereby any ashes remaining in the fire pan are not easily spilled. The device is highly compact when in its knocked down state. Reassembling the grill for normal usage without tools is also extremely simplified and convenient.

Other features and advantages of the invention will become apparent to those skilled in the art during the course of the following description.

BRIEF DESCRIPTION OF THE DRAWINGS

FIG. 1 is an exploded perspective view of a knock-down portable grill according to the present invention.

FIG. 2 is a plan view of the grill.

FIG. 3 is a central vertical section taken on line 3—3 of FIG. 2.

FIG. 4 is a central vertical section showing the grill in the knocked down state for transport or storage in a small space.

DETAILED DESCRIPTION

Referring to the drawings in detail wherein like numerals designate like parts, a knock-down portable grill according to the present invention comprises a fire pan 10, cover or dome 11, grill rack 12, post or pedestal 13 and a base plate 14, and no other components.

As shown in the drawings, the fire pan 10 in the normal use position is open at its top and includes a downwardly conically tapering side wall 15 terminating in a flat bottom wall 16 of considerably smaller diameter than the open top of the fire pan which carries an annular marginal flange 17. Somewhat below the flange 17, the fire pan 10 is equipped at a common elevation with spaced fixed rests 18 for the support of the grill rack 12, as shown in the drawings. In the use position, engaging the rests 18, the grill rack is level and is spaced slightly below the top marginal flange 17 of the fire pan. As shown in FIG. 3, the fire pan 10 has a capacity for holding a substantial quantity of fuel, such as charcoal briquettes.

At its center, the bottom wall 16 of the fire pan has fixed by welding in an opening thereof a short vertical axis sleeve 19 which is slightly conically tapered upwardly. The pedestal tube 13 has its top end portion frictionally and removably socketed in the sleeve 19, FIG. 3, when the device is being used for cooking. The lower end of the tube 13 is similarly socketed removably in a short vertical axis sleeve 20 fixed by welding in an opening of the base plate 14, which is flat and preferably circular. The sleeve 20 is also slightly tapered conically to receive the pedestal tube 13 snugly and frictionally.

The cover 11 or dome includes a conically tapered side wall 21 whose degree of taper matches that of the fire pan side wall 15, and a flat top wall 22. The cover 11 is equipped with a lifting handle 23 fixed to one side thereof, as shown. During normal usage, the cover 11 is downwardly open and equipped with an annular marginal flange 24, preferably of the same outside diameter as the flange 17 of the fire pan. The diameter of the base plate 14 is also preferably equal to the outside diameters of the flanges 17 and 24.

The cover or dome 11 is made slightly larger than the fire pan 10 so that, in the knock-down state of the grill for transport or storage, the fire pan 10 can nest inside of the cover 11 with its flange 17 resting on the flange 24 of the cover. As shown in FIG. 4, the nexted fire pan 10 then has its side and end walls spaced somewhat from the corresponding walls of the cover 11.

The grill rack 12 continues to be supported by the rests 18 within the fire pan, and the pedestal tube 13, following separation from the sleeves 19 and 20, is placed inside of the fire pan, as shown. The separated base plate 14 is inverted and placed on top of the flange 17 to form a lid for the fire pan 10 while traveling or during storage of the unit. By virtue of this arrangement, any ashes remaining in the fire pan 10 are not easily spilled.

The knock-down device with its components interfitting as shown in FIG. 4 can be stored in a space no larger than 12"×24"×18". The grill can be erected for use or knocked down to the condition shown in FIG. 4 without any tools whatsoever. The advantages of the device over the prior art should now be apparent to those skilled in the art without the necessity for any further description.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A knock-down nestable grill comprising
   a fire pan which is open at its top and tapers downwardly and provided at its top with an outwardly directed marginal flange, the fire pan having a flat bottom wall in a plane parallel to said flange,
   a cover which is open at its bottom and which tapers upwardly and having a bottom outwardly directed marginal flange adapted in a use position of the grill to abut and rest on the flange of the fire pan, the cover having a flat top wall in a plane parallel to said flanges and said bottom wall, the cover being somewhat larger in width than the fire pan, whereby the fire pan can nest within the cover when the cover is inverted so that the marginal flange of the cover underlies and supports the marginal flange of the fire pan with the walls of the fire pan and cover somewhat spaced apart during nesting, a removable grill rack supported within the fire pan near and below the marginal flange of the fire pan, and a separable pedestal means for the grill including a post having a detachable connection with the bottom wall of the fire pan and a base plate having a detachable connection with the post, the base plate after being separated from the post being adapted to rest on the marginal flange of the nested fire pan to thereby form a cover for the open top of the fire pan.

2. A knock-down nestable grill as defined in claim 1, and socket elements adapted to receive opposite ends of the post releasably on the bottom wall of the fire pan and on the base plate centrally.

3. A knock-down nestable grill as defined in claim 1, and the marginal flange of the cover being less wide than the marginal flange of the fire pan so that when the outer edges of the flanges are in registration the marginal flange of the fire pan extends somewhat inwardly of the marginal flange of the cover.

* * * * *